(12) United States Patent
Artiuch et al.

(10) Patent No.: US 10,451,458 B2
(45) Date of Patent: Oct. 22, 2019

(54) REGULATING PRESSURE AND HARVESTING ENERGY AS RELATES TO FLOW METERS AND METROLOGY HARDWARE

(71) Applicant: Natural Gas Solutions North America, LLC, Houston, TX (US)

(72) Inventors: Roman Leon Artiuch, Houston, TX (US); Francisco Manuel Gutierrez, League City, TX (US)

(73) Assignee: Natural Gas Solutions North America, LLC, Houston, TX (US)

( * ) Notice: Subject to any disclaimer, the term of this patent is extended or adjusted under 35 U.S.C. 154(b) by 209 days.

(21) Appl. No.: 15/407,083

(22) Filed: Jan. 16, 2017

(65) Prior Publication Data
US 2018/0202844 A1  Jul. 19, 2018

(51) Int. Cl.
*G01F 1/08* (2006.01)
*F03B 13/00* (2006.01)
(Continued)

(52) U.S. Cl.
CPC .............. *G01F 1/08* (2013.01); *F03B 13/00* (2013.01); *F03B 15/00* (2013.01); *G01F 1/075* (2013.01); *G01F 15/00* (2013.01); *H02K 7/1823* (2013.01); *F05B 2220/20* (2013.01); *F05B 2220/7062* (2013.01); *F05B 2270/301* (2013.01); *G01D 4/00* (2013.01); *Y02B 70/346* (2013.01); *Y02E 10/226* (2013.01); *Y04S 20/525* (2013.01)

(58) Field of Classification Search
None
See application file for complete search history.

(56) References Cited

U.S. PATENT DOCUMENTS 3,209,536 A * 10/1965 Howes ...................... F02C 3/10
417/405
5,782,263 A * 7/1998 Isaacson, Jr. ........... F16K 17/20
137/459

(Continued)

FOREIGN PATENT DOCUMENTS

WO  2017/048410 A1  3/2017
WO  2017/048554 A1  3/2017

OTHER PUBLICATIONS

Extended European Search Report and Opinion issued in connection with corresponding EP Application No. 18151386.2 dated Jun. 7, 2018.

*Primary Examiner* — Harshad R Patel
(74) *Attorney, Agent, or Firm* — Paul Frank + Collins P.C.

(57) ABSTRACT

An energy harvester for use in-line with a pipe to harness potential and kinetic energy of fluids flowing therein. Structure for the energy harvester may include a shaft and a blade extending radially therefrom. The shaft can penetrate a housing that operates as a pipe section to install the device in-line with pipe. The shaft can couple with an electrical generator. A load may connect with voltage terminals on the generator so that fluid impinging on the blades will rotate the generator to power the load, effectively harvesting power from the flowing fluid. In one implementation, a load control device that couples with the generator voltage terminals controls a pressure characteristic of the fluid, such as pressure drop, by applying an electrical load on the generator and controllably impeding rotation of the shaft.

20 Claims, 8 Drawing Sheets

(51) Int. Cl.
*G01F 1/075* (2006.01)
*F03B 15/00* (2006.01)
*G01F 15/00* (2006.01)
*H02K 7/18* (2006.01)
*G01D 4/00* (2006.01)

(56) References Cited

U.S. PATENT DOCUMENTS

| | | | |
|---|---|---|---|
| 6,886,414 B2 | 5/2005 | Gutierrez et al. | |
| 6,907,727 B2 * | 6/2005 | Turchetta | F01D 15/10 415/117 |
| 7,043,905 B2 * | 5/2006 | Turchetta | F01D 15/10 415/117 |
| 7,127,347 B2 * | 10/2006 | Moser | F01N 3/035 701/114 |
| 8,680,704 B1 * | 3/2014 | Rooney | F03B 13/02 290/54 |
| 2004/0146394 A1 * | 7/2004 | Turchetta | F01D 15/10 415/13 |
| 2005/0217259 A1 * | 10/2005 | Turchetta | F01D 15/10 60/398 |
| 2005/0285069 A1 | 12/2005 | Fernandez-Sein | |
| 2009/0236852 A1 | 9/2009 | Balzano | |
| 2013/0312421 A1 * | 11/2013 | Palczewski | F02C 7/232 60/772 |
| 2013/0341934 A1 * | 12/2013 | Kawanishi | B60L 8/00 290/1 A |
| 2014/0165719 A1 | 6/2014 | Williamson et al. | |
| 2014/0346776 A1 | 11/2014 | Park | |
| 2015/0102603 A1 | 4/2015 | Schaefer et al. | |

\* cited by examiner

REGULATING PRESSURE AND HARVESTING ENERGY AS RELATES TO FLOW METERS AND METROLOGY HARDWARE

BACKGROUND

Engineers expend great efforts to make devices easy to assemble, reliable to operate, and amenable to maintenance and repair tasks. Hardware constraints can frustrate these efforts because the hardware lacks appropriate functionality and because any improvements can increase costs and/or add complexity to the device. For example, metrology hardware (e.g., gas meters) often suffers from a dearth of power or power generating sources that are resident on the device.

SUMMARY

The subject matter of this disclosure relates to metrology and metrology hardware. Of particular interest herein are improvements that provide power to electronics found on metrology devices, namely flow meters and the like devices that measure parameters of flowing fluids. These devices may find use in billing applications to charge an end user for fuel (e.g., natural gas). Utility companies may rely on values from the flow meter to assign a monetary value to charge the customer. The values may also serve in custody transfer applications, which transfer fluids (e.g., natural gas, oil, etc.) from a supplier to a recipient, to account for the amount of fluid that transfers between these operators.

Some embodiments incorporate an energy harvester that can leverage flowing fluids (e.g., gas) to generate power. These embodiments may include components that harness the kinetic and potential energy of the flowing fluid. The components may also configure the energy harvester to modulate parameters of the flowing fluid. In this way, use of the embodiments can reduce pressure fluctuations to maintain accuracy of flow meters in accordance with regulatory standards and customer needs. As an added benefit, the embodiments can replace existing pressure regulators, which may be found in proximity to fuel meters to satisfy pressure requirements for use at the customer's location.

These embodiments can also address certain drawbacks of on-board power sources. Power from the energy harvester may power electronics on-board flow meters, often to replace, supplement, or charge a power source also found on-board these devices. Such functions may reduce duty cycle on the on-board power source to preclude maintenance that is necessary to check and replace batteries and battery packs found on devices in the field. For flow meters and like metrology hardware, this feature can save significant costs of labor because these devices can number in the hundreds and thousands in the field and, moreover, often reside in remote areas, both of which may present major logistical challenges that require careful planning. The energy harvester can also improve reliability in the event that batteries die unexpectedly or suffer reduction or total loss of energy prematurely, which is a significant nuisance and unplanned expense for the operator.

The embodiments may further address future power needs for flow meters and related metrology devices. It is likely that future data transmission demands will outstrip or exceed power available from the on-board power source by, for example, drawing an unreasonable amount of power from an on-board battery or energy storage unit. This deficiency can also foreclose any expansion of functionality in the form of new electronics and sensors including transmitting devices to communicate with a Supervisory Control And Data Acquisition (SCADA) system, cloud-connected product life-cycle management software, and the like. Such functions may have duty cycles for transmitting data that requires real-time data transmission to monitor ongoing device health or diagnostics in a connected system, which may require almost-continuous supply of reliable power on the device.

BRIEF DESCRIPTION OF THE DRAWINGS

Reference is now made briefly to the accompanying figures, in which.

Figure 1:
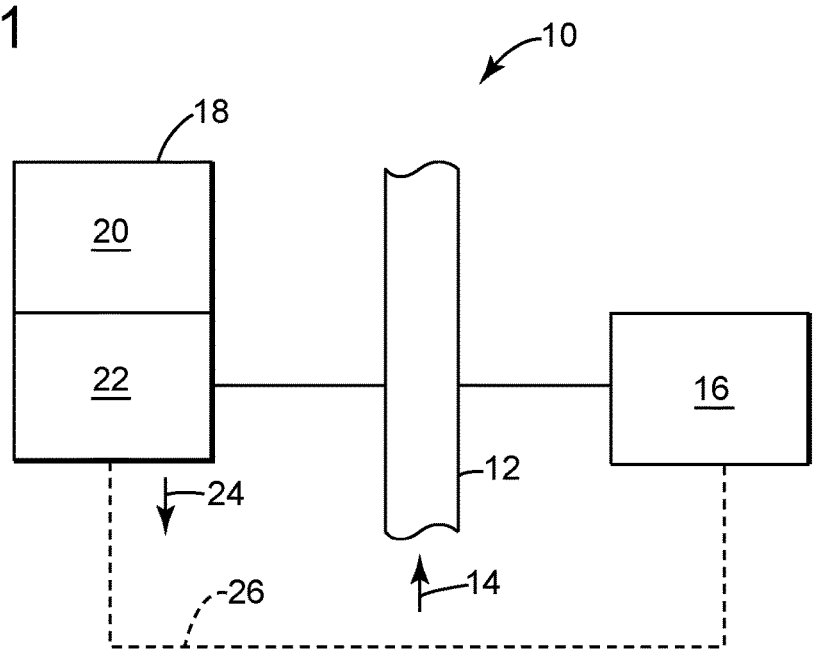
FIG. 1 depicts a schematic diagram of an exemplary embodiment of an energy harvester

Where applicable like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The embodiments disclosed herein employ structure to harvest energy in situ on gas meters and related metrology devices. These devices may quantify parameters (e.g., flow rate, volume, etc.) of flowing materials like fluids and solids, for example, using electro/mechanical means with rotating elements (e.g., impellers) that can generate pulses indicative of the flow. As described below, embodiments may arrange blades in the flow of material. The blades can couple with a generator that coverts rotary movement of the blades into electrical signals to a load. This arrangement is effective to re-coup energy from the natural flow of natural gas that feeds the flow meter. This energy is normally lost. As an added benefit, however, the embodiments may operate to also regulate characteristics of the flow of material. This feature is useful to modulate pressure-related inaccuracies, while at the same to foreclosing the need to include additional components (e.g., pressure regulators) to modulate flow into the flow meter. Other embodiments are within the scope of the subject matter of this disclosure.

FIG. 1 illustrates a schematic diagram of an exemplary embodiment of an energy harvester 10. This embodiment couples with a conduit 12 that carries material 14. Material 14 may be a gas, a liquid, a particulate solid, or a liquid/solid mix. In one example, which shall be used throughout, material 14 is natural gas. As also shown, the energy harvester 10 may couple with a metrology device 16 that is configured to measure parameters (e.g., flow rate, flow volume, etc.) of material 14. These configurations include flow meters and like devices with metrological instruments that interact with the flow of material 14 in a way that is useful for utilities to bill customers. As noted more below, the energy harvester 10 may include structure to scavenge energy from the flow of material 14 with little to no interference with accuracy of the metrology device 16. This feature is important to avoid issues that can propagate as customer billing errors, which is highly undesirable in billing applications. Generally, the structure for the apparatus may include a housing 18, a flow unit 20, and a power unit 22. The housing unit 18 may be configured with a flowpath that directs the flow of material 14 in contact with the flow unit 20. In use, the flow may impinge on the flow unit 20, which in turn causes the power unit 22 to generate a signal 24, typically an electrical signal. An electrical interface 26 can direct the signal 24 for use as a power source on the metrology device 16. This power source may operate to supplement existing power source(s) like batteries found on the metrology device 16.

Figure 2:
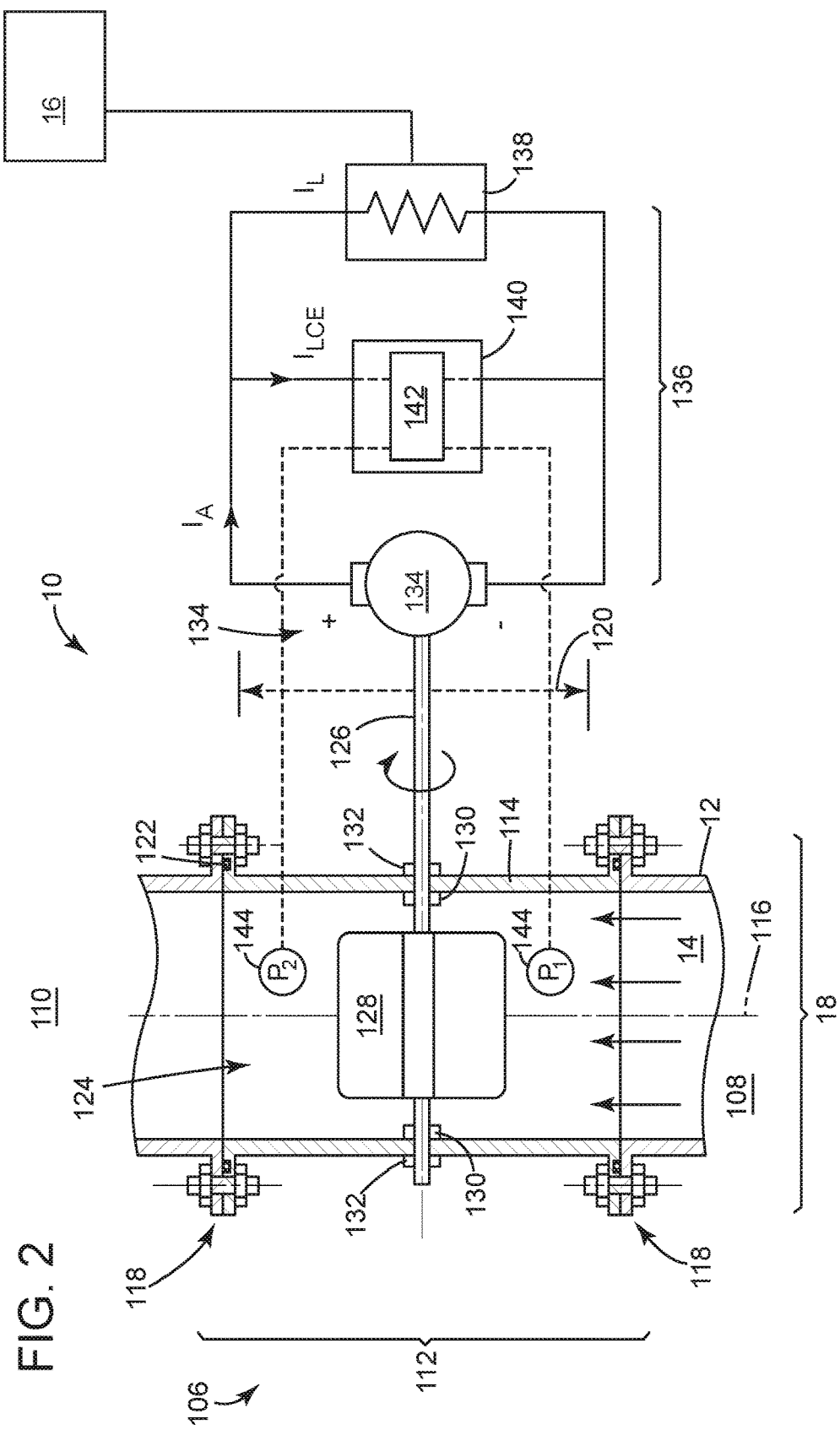
FIG. 2 depicts a plan view of the top, in cross-section, of structure for use as the energy harvester of FIG. 1.

FIG. 2 illustrates a plan view of an exemplary embodiment of structure that embodies the energy harvester 10 of FIG. 1. The structure may form an apparatus, system, or kit, each having components to facilitate operation of the energy harvester 10. In this embodiment, the housing unit 18 forms an enclosure 106 with open ends (e.g., a first open end 108 and a second open end 110). The enclosure 106 may comprise a pipe section 112 with a peripheral wall 114 that circumscribes a central axis 116 to form an interior bore or aperture. On the open ends 108, 110, the peripheral wall 114 may give way to a flange 118. Examples of the flange 118 may form structure that mate with corresponding features on exposed ends of the conduit 12. This structure can allow the pipe section 112 to replace a missing portion of the conduit 12. Bolts or welds may be useful to secure the pipe section 112 to the conduit 12. This feature facilitates flow of material 14 from one exposed end of the conduit 12 to the other exposed end of the conduit 12, the exposed ends being separated by the missing portion. An o-ring seal 122 or like water-tight mechanism may interpose between the flange 118 and the conduit 12 to prevent leaks of material 14 from inside of the pipe section 112 or the conduit 12, generally.

Parts of the flow unit 20 may reside on the pipe section 112. These parts may include a rotary mechanical device 124 that can be configured to convert kinetic and potential energy from flowing material 14 to useful work. These configurations may embody a reaction turbine with a shaft 126 and one or more blades 128 that extend radially outwards from the shaft 126. Alternatives to the blades 128 include impellers, flywheels, and like devices operative to move in response to passing flow of material 14. The shaft 126 may extend laterally across the bore of the pipe section 112 to couple with the peripheral wall 114. The blades 128 may couple with the shaft 126 so as to reside in the flow of material 104. Bearings 130 may support the ends of the shaft 126 at the peripheral wall 114, effectively to permit appropriate motion, namely, rotation of the shaft 126 in this current embodiment. The bearings 130 may embody various devices (e.g., ball bearings, journal bearings, bushings etc.) that are satisfactory for use in the particular application (e.g., complaint with material 14). These devices may locate inside of the bore, outside of the peripheral wall 114, or both. In one embodiment, bearing support components 132 may bolt or otherwise secure outside of the peripheral wall 114. These components may secure bearings 130 in position on the inside of the bore. In any configuration where the shaft 126 (or other components) extends through the wall of the conduit 102, it may be helpful to properly seal to prevent leaks of material 14. Gaskets, adhesives, and sealants may be useful for this purpose.

In use, the enclosure 106 directs material 14 to impinge upon the blades 128 to create a force. With proper design of the blades 128, the force on each blade 128 is sufficient to rotate the shaft 126, effectively creating work (typically characterized as a torque value on the shaft 126). The power unit 22 expresses the work as the signal 24 for use at one or more collateral components, for example, to power sensors or charge a battery on the metrology device 16. This feature is useful to supplement power requirements that may not be satisfied on-board the metrology device 16 or locally by an outside power supply.

The power unit 22 may be configured to convert work to electricity. These configurations may include an electrical generator 134. In practice, one end of the shaft 126 may extend through the peripheral wall 114 to engage with the electrical generator 134. Examples of the generator 134 may include a direct current (DC) generator or like devices that can convert the torque (or, more broadly, mechanical energy) of the shaft 126 to electrical signals. The electrical signals may propagate in a circuit 136 that connects to a load 138, for example, a power source or supply that may power electronics or charges a battery on the metrology device 16. Without the load 138 on the generator 134, the blades 128 perform no work and material 14 passes, effectively, unimpeded through the apparatus 100. There is little to no pressure drop across the blades 128. However, when the load 138 is applied, the blades 128 can extract energy from material 14 to drive the generator 134 and, since there is no change in flow rate, a pressure drop occurs in the fluid across the blades 128, denoted at locations $P_1$ and $P_2$. Generally, the pressure drop is a function of the load 138 applied to the generator 134, and thus, will vary with the load 138.

The apparatus 100 may be configured to modulate or regulate flow of material 14. Such configurations may include a load control device 140 with a microcontroller 142, at least one of which couples to the generator 134. The load control device 140 may be configured to apply an electrical load on the generator 134. This electrical load can controllably impede rotation of the shaft 126 on the rotary mechanical device 124. In doing so, the load control device 140 can maintain a predefined pressure drop across the blades 128, while still powering the load 138 if desired. This feature may eliminate pressure fluctuations to maintain accuracy of measurements of the metrology device 16.

Use of the load control device 140 can regulate the electrical load, or "loading," on the generator 134. In one implementation, readings from sensors 144 at locations $P_1$ and $P_2$ can provide values to the microcontroller 142 to complete a pressure drop calculation. The microcontroller 142 may compare an output of this calculation to a predetermined value to define a relationship between the two values. In one implementation, the microcontroller 142 can use the relationship to set a variable load on the generator 134, effectively adjusting the speed of the shaft 126 until the pressure drop (from $P_1$ to $P_2$) reaches the predetermined value. The variable load may be provided by, for example, one or more transistors and/or MOSFETs found on or in connection with the load control device 140.

The load control device 140 may dynamically adjust the load on the generator 134 to respond to changes in flow of material 14. These adjustments may maintain the desired pressure drop, but this does not always need to be the case. In one example, the load control device 140 can maintain a constant pressure drop even when the flow of material 14 is not constant. The load control device 140 may set the variable load to the generator 134 to adjust the speed of the shaft 126 in order to control $P_2$, the pressure downstream of the blades 128. The downstream pressure value $P_2$ may be controlled with such precision that the energy harvester 10 also obviates the need for any collateral device (e.g., a pressure regulator) upstream of the metrology device 16. In another example, the load control device 140 may set the variable load to the generator 134 to maximize the power to the load 138. The upper limit of the load 138 may be reached, for example, when the pressure drop reaches a maximum allowable value, such as a value mandated by a structural limit of the rotary mechanical device 124. In yet another example, the load control device 140 sets the variable load to the generator 134 to effect a braking action on the shaft 126. The variable load can be increased up to the maximum allowable pressure drop, $(P_1-P_2)$. When the flow of material 14 remains unchanged, the braking action increases the load on the blades 128, which in turn increases the torque on the shaft 126 to collectively increase the power to the load 138.

Figure 3:
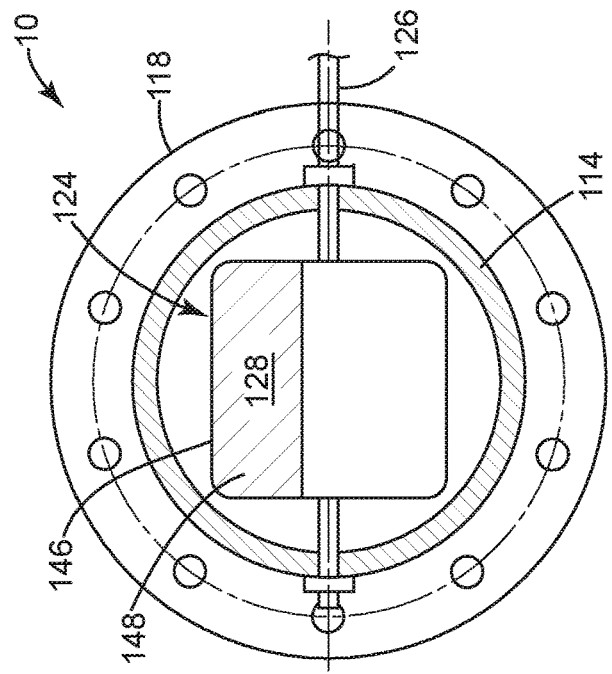
FIG. 3 depicts an elevation view of the front of the structure of FIG. 2.

FIG. 3 depicts an elevation view from the front of the apparatus of FIG. 2. Each of the blades 128 may have a body 146 with geometry that defines an effective area 148. The geometry may assume a curved shape, possibly so that the blades 128 form an airfoil or like "aerodynamic" design. The body 146 may be constructed of metals, composites, or plastics, but this listing is not exhaustive. Preference may given to materials that are compatible with material 14 to avoid corrosion or degradation. In practice, the effective area 148 may consume part of the cross-sectional area of the bore, preferably optimized to maximize output and ability of the device to harness energy from the flow of material 14. It is important though that dimensions for the geometry avoid interference with the peripheral wall 114.

Figure 4:
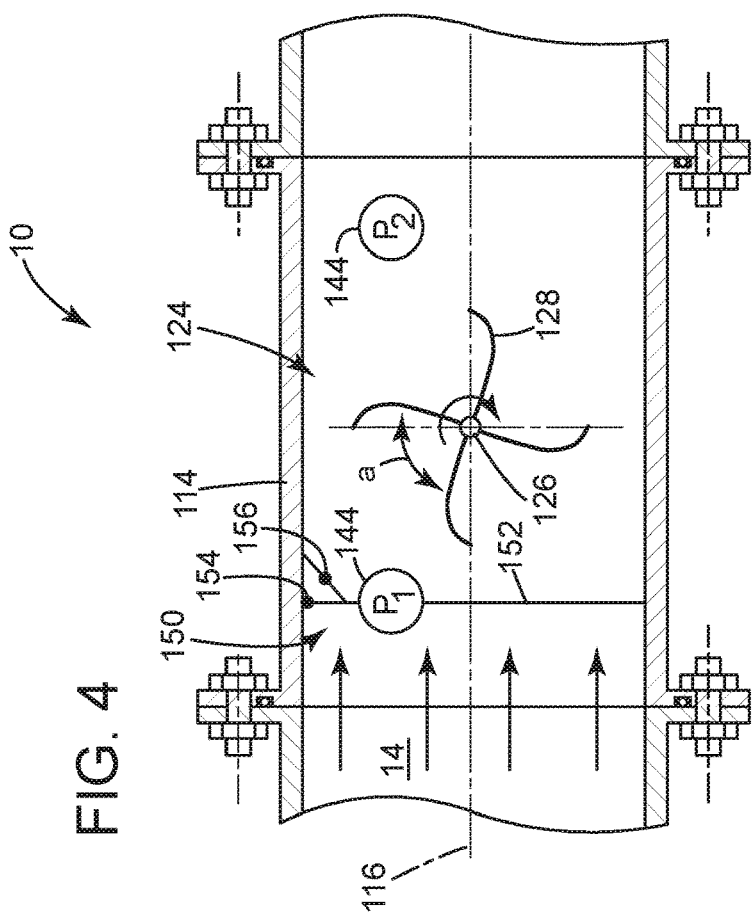
FIG. 4 depicts an elevation view of the side of the structure of FIG. 2.

FIG. 4 depicts an elevation view from the side of energy harvester 10 of FIG. 2. The blades 128 may be configured with adjacent ones separated by an annular offset a. The number of blades 128 disposed about the shaft 126 may correspond with values for the annular offset a (as well as, for example, geometry of the body 146). This number may be 4, as shown, although more or less of the blades 128 may be used in the device. Further in the diagram of FIG. 4, the energy harvester 10 may benefit from a gate 150 that resides in the bore of the pipe section 112. In use, the gate 150 may be found upstream of the rotary mechanical device 124 or, by definition, closer to the open end 108, 110 that is to receive flow of material 14 from the conduit 12. The gate 150 may include a door 152 that may affix to the peripheral wall 114 at a joint 154. This configuration provides a pivot for the door 152 to rotate or "swing" between two positions, a first or "open" position and second or "closed" position, as shown generally by the arrow enumerated with the letter R. A biasing member 156 like a spring may be used to generating a biasing force that opposes the flow of material 14. In use, the gate 150 defines a flow area of the bore in the pipe section 112. With the door 152 in its closed position, the flow area is smallest, or effectively zero. Movement of the door 152 from the closed position increases the flow area. In use, the door 152 will remain in the closed position until the flow of material 14 (or, pressure of flow against the door 152 builds until it) is enough to overcome the biasing force of the spring.

Figure 5:
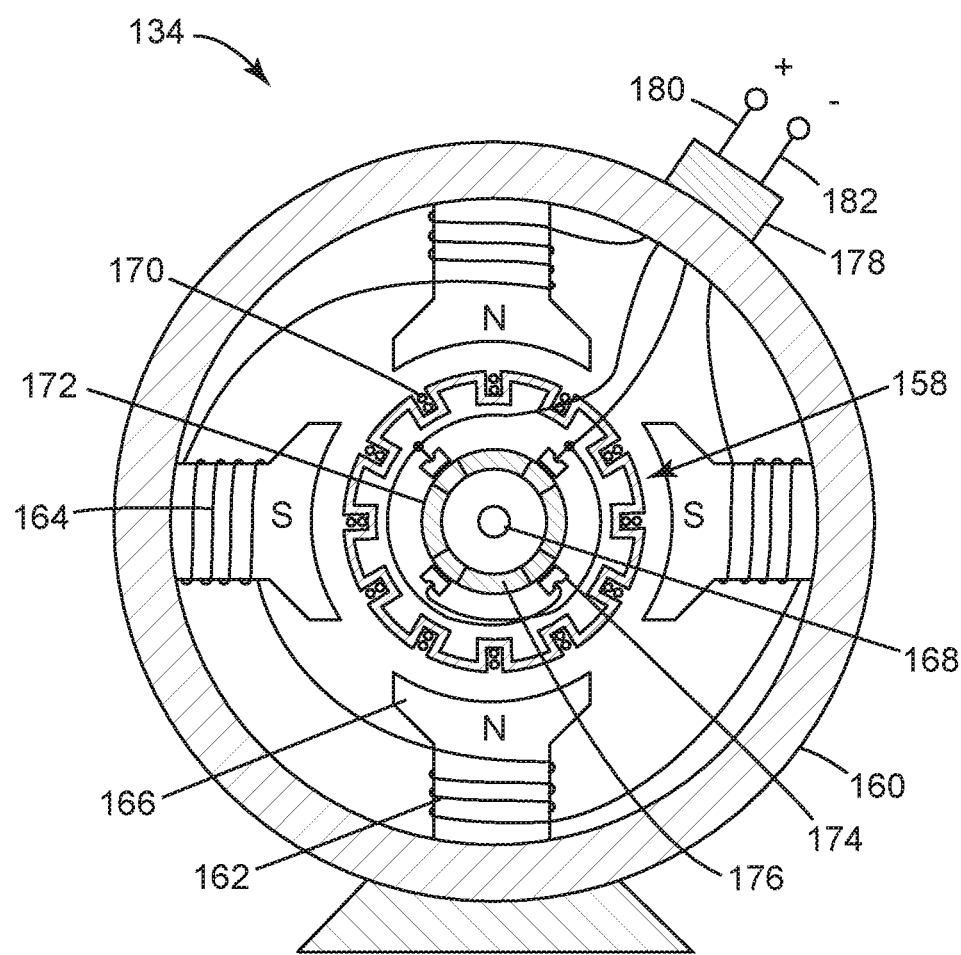
FIG. 5 depicts a schematic diagram of an example of a four-pole DC generator for use in the energy harvester of FIGS. 1 and 2.

FIG. 5 depicts an exemplary structure for the generator 134 of FIG. 2. This structure embodies a four-pole DC device, but this is for illustrative purposes, and should not work to limit the disclosure to any particular configuration for the generator 134. For example, it should be noted that the generator 134 may have fewer poles, such as two, or more poles, such as six or eight. In one implementation, the generator 134 generally includes a stationary section, or stator, and a rotating section, or armature 158. The stator section provides a uniform magnetic field (or main field flux) within which the armature rotates, and generally includes an outer steel housing, or yoke 160, that provides mechanical support. Magnetic field poles 162 can fasten to the inner diameter of the yoke 160, possibly by bolts or welds. The field poles 162 may comprise electromagnets having field coils 164 comprising a large number of turns of thin wire about a pole shoe 166. Current flowing through the field coils 164 creates the magnetic flux. The pole shoe 166 may uniformly spread out the magnetic flux in the gap between the stator and armature core. In one implementation, the field coils 164 are connected in such a way that adjacent poles have opposite polarity.

The rotating armature 158 includes a core that is keyed or otherwise mounted to an armature shaft 168. The core is typically formed by laminating a stack of thin circular steel disks. Each disk can be coated with an insulating film to reduce eddy current losses. The core defines longitudinal slots to carry armature windings 170. The armature windings 170 are typically formed from thin, insulated copper wire, wound around the core in a special pattern that may, for example, lay into the longitudinal slots. The copper wire may connect in a symmetrical manner to form a closed loop or a series of closed loops. When the armature windings 170 rotate through the main flux field of the field poles 162, an electromotive force (emf) is induced in the wire, characterized as a voltage potential.

Physical connection from the rotating armature 158 to the yoke 160 may be made through a commutator-brush arrangement, enumerated by 172 and 174, respectively. However, the generator 134 may be without bushes 174. In use, the commutator 172 is configured to collect the current generated in the armature windings 170. These configurations embody a mechanical rectifier that converts the alternating voltage generated in the armature windings 170 into direct voltage across the brushes 174. The commutator 172 may be formed of copper segments insulated from each other by mica sheets and keyed or otherwise mounted on the armature shaft 168. The number of segments is equal to the number of armature windings 170; each segment is soldered or otherwise connected to an armature winding.

The brushes 174 provide physical contact and solid electrical connection between the rotating commutator 172 and the stationary external load circuit 138. The brushes 174 may be formed of carbon or graphite. These devices may rest on commutator segments 176. In use, the brushes 174 may slide on the segments 176 in response to rotation of the commutator 172. Adjustable springs may apply contact pressure to the brushes 174 to ensure physical contact for optimal collection of the electrical current. Multi-pole generators typically have one brush 174 for each field pole 162, with each brush alternating positive and negative polarity as the field pole. Brushes 174 having the same polarity are connected together and feed to a terminal box 178 that has two leads: a positive voltage terminal 180 and a negative voltage terminal 182.

Figure 6:
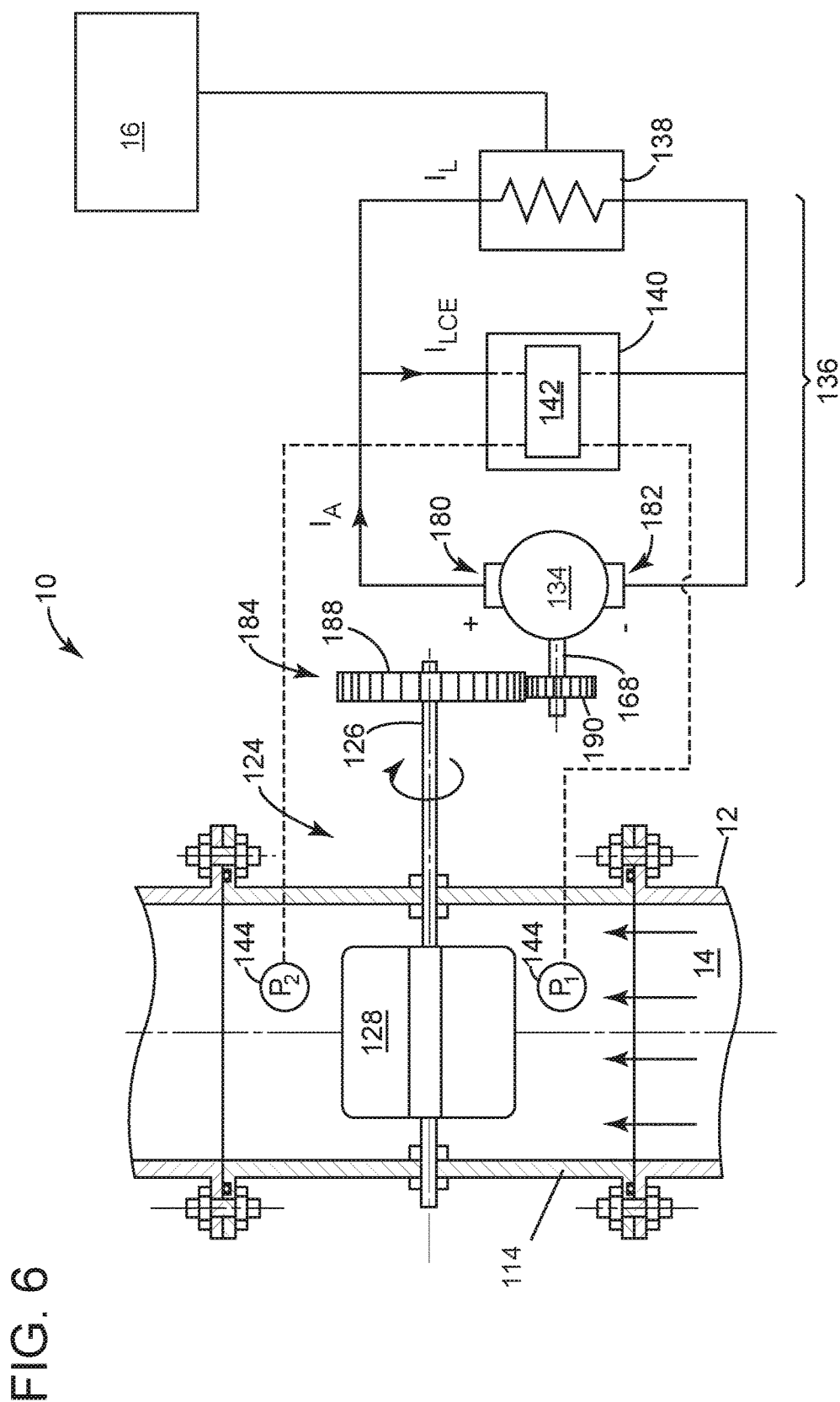
FIG. 6 depicts a plan view of the structure of FIG. 2 with additional components.
Figure 7:
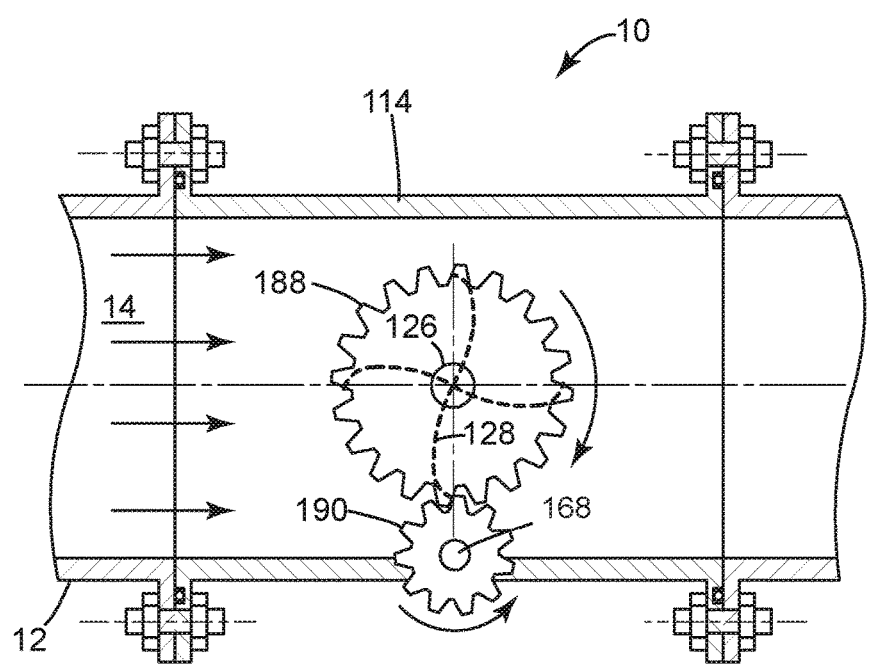
FIG. 7 depicts an elevation view of the side of the structure of FIG. 5.

FIGS. 6 and 7 depict additional exemplary structure for the energy harvester 10 of FIG. 2. This structure includes a torque transmission device 184 that is configured to proportionally change the rotational speed of the armature shaft 168 relative to the rotational speed of the shaft 126 on the rotary mechanical device 124. In one embodiment, the torque transmission device 184 includes a gear assembly with integrated gears (e.g., a first gear 188 and a second gear 190). The gears 188, 190 may reside outside of the peripheral wall 114, but this disclosure does contemplate configurations in which one or more of gears 188, 190 are found inside the bore or integrated into the peripheral wall 114. In one implementation, the first gear 188 may couple with the shaft 126 of the rotary mechanical device 124. The second gear 190 (also "pinion gear 190") is typically smaller that the first gear and may couple to the armature shaft 168. By coupling the smaller diameter pinion gear 190 to the armature shaft 168, the armature 158 in the generator 134 can be configured to rotate many times faster than the blades 128. This configuration can allow the structure to provide electrical power to the load 138 even when material 14 is flowing extremely slow. For example, in one particular low-flow condition, the rotary mechanical device 124 would only turn between one-half revolution per minute (rpm) and one full rpm. A gear ratio between the gears 188, 190 may advantageously be set according to the particular flow conditions and the anticipated load 138 on the generator 134. For example, the gear ratio may be, 10:1, 20:1, or even 30:1, so the armature shaft 168 and armature 158 would spin 10 to 30 times faster, thereby generating significantly more power.

By way of practical example, natural gas service may provide gas to a residential structure. The services include a supply line from the street that is 5 inches in diameter at a head pressure of 60 psi. A service line at the residence is reduced to a quarter-inch diameter pipe at a pressure of 6 inches of water (0.2 psi). The large pressure head provides an abundant source of potential energy to work on the rotary mechanical device 124, and the low usage flow rate can be leveraged with the torque transmission device 184 having a very high gear ratio. The load control device 142 can be utilized to assure a very heavy variable load is applied to the generator 134 to impede rotation of the shaft 128 and achieve a large pressure drop across the blades 128 of the rotary mechanical device 124, thus maximizing power available to the load 138. The load 138 may be used to power electrical devices on the gas meter or charge batteries.

Figure 8:
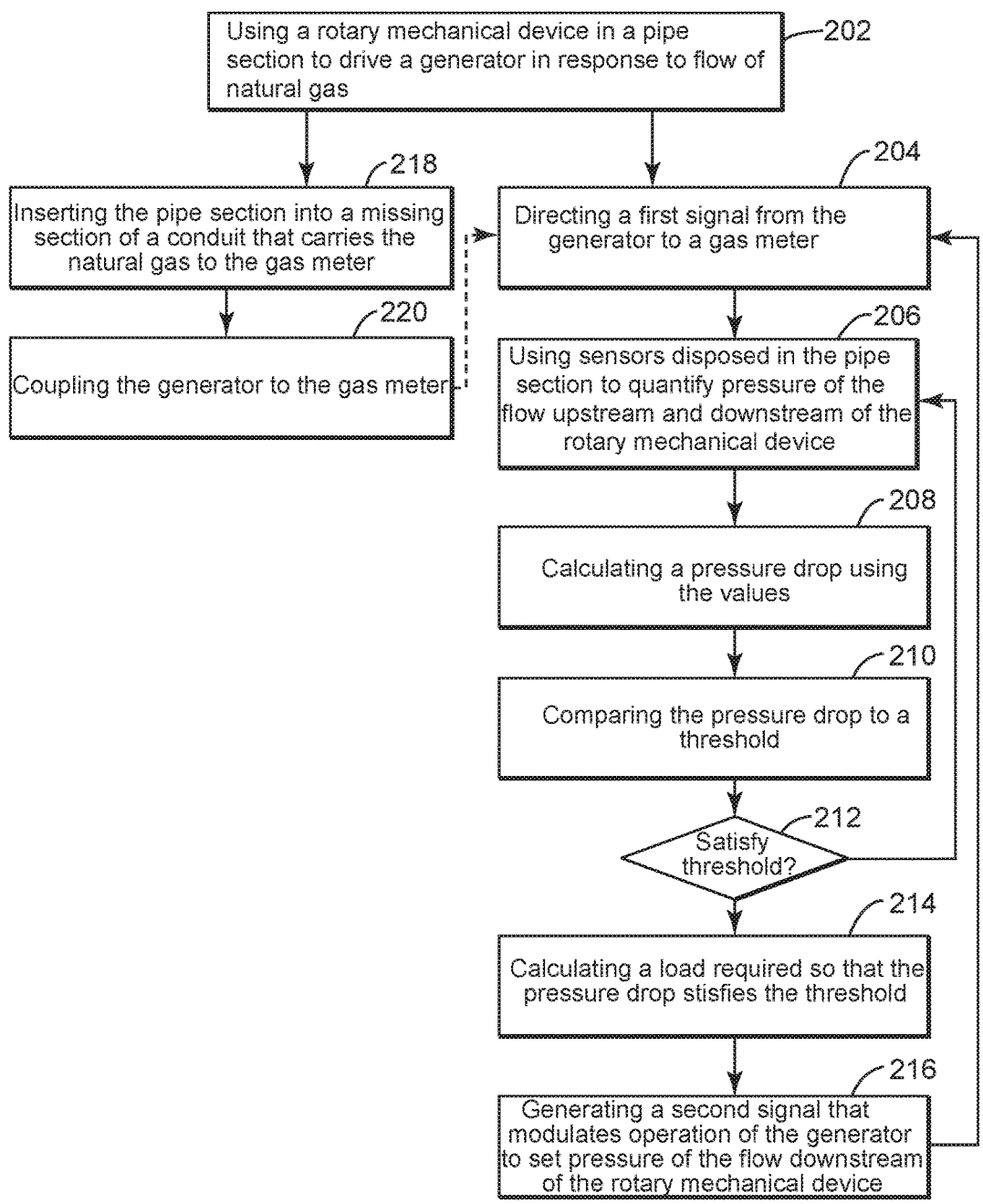
FIG. 8 depicts a flow diagram of an exemplary embodiment of a method for regulating a pressure in a pipe.

FIG. 8 depicts a flow chart illustrating a method 200 for providing power to metrology devices. The method 200 may include, at stage 202, using a rotary mechanical device in a pipe section to drive a generator in response to flow of natural gas. The method 200 also includes, at stage 204, directing a first signal from the generator to a gas meter. The method 200 further includes, at stage 206, using sensors disposed in the pipe section to quantify pressure of the flow upstream and downstream of the rotary mechanical device. The method 200 may include, at stage 208, calculating a pressure drop using the vales and, at stage 210, comparing the pressure drop to a threshold and, at stage 212, identifying a relationship in accordance with a position of the pressure drop relative to the threshold. The method 200 may also include, at stage 214, calculating a load required so that the pressure drop satisfies the threshold. The method 200 may further include, at stage 216, generating a second signal that modulates operation of the generator to set pressure of the flow downstream of the rotary mechanical device. In one implementation, the method 200 may also include, at stage 218, inserting the pipe section into a missing section of a conduit that carries natural gas to a gas meter and, at stage 220, coupling the generator to the gas meter.

At stage 202, the method 200 uses the rotary mechanical device to drive the generator. This stage allows fluid flow through the pipe section. Preferably, the pipe section installs proximate the gas meter at less than 2 meters or so. A shut-off valve may be included to regulate flow, possibly upstream of both the gas meter and rotary mechanical device. The pipe section may assemble to the gas meter. However, it may benefit installation if the gas meter integrates or incorporates the features of the pipe section, whether as a separate piece or monolithic structure.

At stage 204, the method 200 directs a first signal from the generator to the gas meter. This first signal is useful to provide power to the gas meter. This stage may include one or more stages for prepare the first signal prior to it impressing on the gas meter. For example, the signal may be stepped-up or stepped-down, converted (e.g., rectified or inverted), and the like. These stages could benefit from appropriate circuitry with discrete elements (e.g., transistors, resistors, etc.) that populate a substrate.

At stage 206, the method 200 uses sensors to monitor pressure across the rotary mechanical device. These sensors may embody transducers, but any type of responsive device may work. It follows as well the sensors may be are sensitive to other characteristics (e.g., temperature, contaminants, etc.). Such characteristics may prove useful to maintain accuracy of the gas meter or, nominally, to understand the operation of the gas meter and energy harvesting device.

At stages 208, 210, 212, and 214, the method 200 can use pressure to regulate operation of the generator. These stages may be embodied by executable instructions in the form of computer programs, software, firmware, and the like. The executable instruction may reside on memory, possibly as part of the microcontroller or separately enabled as RAM, ROM, SDRAM, etc. Operatively, the executable instructions can configure the microcontroller to perform these stages.

At stage 216, the method 200 generates the second signal. This stage may include stages to prepare the signal as noted above. Outside of this, it's possible that this stage may benefit from various stages for exchanging data and information, data processing, and like data manipulation. Wireless and wired communication means may be used, particularly as relates to conveying data to and from the sensor. Where applicable, the data may be sent to a central repository or cloud storage for use in analytics.

At stages 218, 220, the method 200 installs the pipe section into the conduit. This stage can include various stages that are helpful to prepare the conduit, for example, by cutting the existing conduit to make room for the energy harvester. A technician may be required, although this may not be necessary.

This disclosure considers that devices like the energy harvester may require service and maintenance to attend to its parts. Over time, parts may experience wear and, possibly, damage. A technician may need to extract these parts, either in whole or in pieces, to remove existing parts in favor of one or more replacement parts. The replacement parts may originate from an OEM or alternative aftermarket dealer and/or distributor. Examples of the replacement parts may be newly constructed using any of the conventional manufacturing and machining techniques (including additive manufacturing). For certain techniques, a model file that comprises one or more instructions of executable code (on a storage media and/or downloadable and/or executable) may be used to define the features of the replacement part. These instructions may cause a machine (e.g., a lathe, milling machine, 3-D printing machine) to perform certain functions to result in parts for use in the energy harvester 10.

One or more of the replacement parts for the energy harvester 10 may be formed by existing parts. Certain parts may lend themselves to refurbishing and like processes to prepare the existing parts into condition and/or to meet specifications for use as the replacement part in the structure. Refurbishing may utilize additive and subtractive manufacturing processes like buffing, bead-blasting, machining, and like practices that are useful to build-up and/or remove material from the part, as desired. Exemplary additive manufacturing processes may include 3-D printing with polymers, laser metal sintering, as well as after-developed technology.

The replacement parts may be assembled into the energy harvester 10 as a wholly-constructed assembly. In other implementations, the replacement parts may embody individual parts, as well as combinations and compilations thereof, possibly in the form of one or more sub-assemblies.

Figure 9:
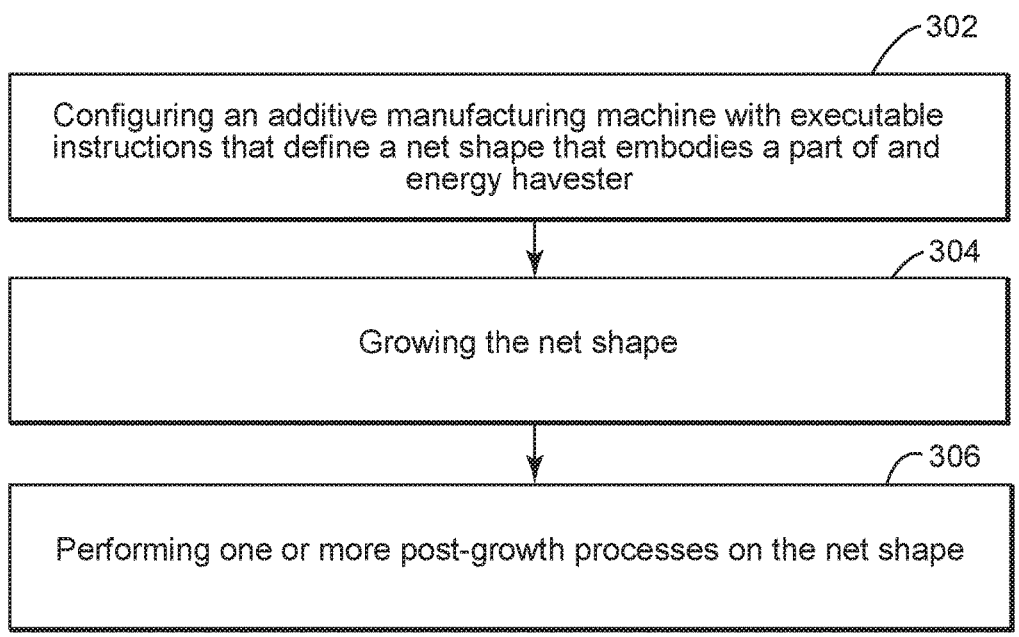
FIG. 9 depicts a flow diagram of a process to manufacture an example of the individual parts for use on the energy harvester of FIGS. 1 and 2.

FIG. 9 illustrates an exemplary process 300 to manufacture an example of the individual parts. The exemplary process may leverage additive manufacturing techniques, alone or in combination with one or more other types of subtractive manufacturing techniques. As shown in FIG. 9, the process 300 can include, at stage 302, configuring an additive manufacturing machine with executable instructions that define a net shape. The net shape can embody the part, in whole or in part, including, for example, configurations of the housing, blades, gears, described hereinabove. The process 300 can also include, at stage 304, growing the net shape and, where necessary, at stage 306, performing one or more post-growth processes on the net shape.

Implementations of the process 300 and related assembly techniques can render embodiments of the energy harvester 10. These implementations may result in, for example, a blade by the process of configuring an additive manufacturing machine with executable instructions that define a net shape, growing the net shape, and performing one or more post-growth processes on the net shape. Such implementation that result in the blade are also contemplated wherein the one or more post-growth processes comprises one or more of heat treating the net shape, deburring the net shape, machining the net shape, applying a surface finish to one or more surfaces of the net shape, removing material of the net shape using abrasives, and inspecting the net shape to accumulate dimensional data and comparing the dimensional data to a default value.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In light of the foregoing discussion, the embodiments herein harvest potential and kinetic energy of flowing fluids. For gas meters, this feature can provide power to supplement, or replace, on-board batteries. These embodiments are also effective to regulate pressure or pressure drop of the flowing fluids so that the gas meter can operate without the need for a pressure regulator. In this regard, the examples below include certain elements or clauses one or more of which may be combined with other elements and clauses describe embodiments contemplated within the scope and spirit of this disclosure.

What is claimed is:

1. A system, comprising:
    a pipe section forming a flowpath;
    a rotary mechanical device at least partially disposed in the flow path;
    a generator operative to generate a first electrical signal in response to rotation of the rotary mechanical device; and
    a load control device connected in parallel with the generator and with a load, the load control device operative to generate a second electrical signal that is applied to the generator to modulate operation of the generator.

2. The system of claim 1, further comprising a shaft that extends through the pipe section, the shaft having an end to couple with the generator to transfer rotation of the rotary mechanical device to the generator.

3. The system of claim 1, wherein the rotary mechanical device comprises blades disposed in the flowpath.

4. The system of claim 1, further comprising sensors disposed on either side of the rotary mechanical device, wherein the load control device includes a microcontroller operative to compare values from the sensors to set the second signal.

5. The system of claim 4, wherein the sensors are configured to quantify values for fluid pressure.

6. The system of claim 1, further comprising a gate disposed in the flowpath, wherein the gate is operative to regulate a flow area of the flow path.

7. The system of claim 6, wherein the gate has a door and a joint securing the door to the pipe section to permit the door to rotate about the joint to change the flow area of flow path.

8. The system of claim 7, further comprising a spring coupled to the door to bias the door in a closed position that minimizes the flow area.

9. An apparatus, comprising:
    an elongate tube having a peripheral wall forming a bore terminating at open ends with flanges;
    a shaft extending across the bore;
    blades coupled with the shaft and disposed in the bore;
    pressure sensors disposed on either side of the blades; and
    a circuit configured to connect a load in parallel with,
        a load control device with a microcontroller coupled with the pressure sensors; and
        a generator coupled with the load control device and with the shaft,
    wherein the microcontroller is operative to calculate pressure drop across the blades using values from the pressure sensors to cause the load control device to generate an electrical signal that is applied to the generator to impede rotation of the shaft.

10. The apparatus of claim 9, further comprising:
a first gear coupled with the shaft; and
a second gear coupled with the first gear and smaller than the first gear.

11. The apparatus of claim 9, wherein the generator is a direct current generator coupled with the shaft.

12. The apparatus of claim 9, further comprising:
a gate disposed in the bore, the gate having a door and a joint securing the door inside of the peripheral wall, wherein the door is configured to rotate about the joint to set a flow area for bore.

13. The system of claim 12, wherein the gate comprises a spring coupled to the door to locate the door in a closed position that minimizes the flow area.

14. The apparatus of claim 9, further comprising:
bearings disposed in the peripheral wall, wherein the shaft extends into the bearings.

15. The apparatus of claim 14, wherein the shaft comprises a portion that extends outside of the peripheral wall.

16. The apparatus of claim 9, further comprising:
a gas meter coupled with the generator.

17. A method, comprising:
using a rotary mechanical device in a pipe section to drive a generator in response to flow of natural gas through the pipe section;
directing a first electrical signal from the generator to a gas meter; and
generating a second electrical signal that is applied to the generator, the second electrical signal transiting a circuit that connects the generator in parallel with a load, the second signal used to modulate operation of the generator and influence rotation of the rotary mechanical device to set pressure of the flow downstream of the rotary mechanical device.

18. The method of claim 17, further comprising:
inserting the pipe section into a missing section of a conduit that carries the natural gas to the gas meter.

19. The method of claim 17, further comprising:
using sensors disposed in the pipe section to quantify values for pressure of the flow upstream and downstream of the rotary mechanical device.

20. The method of claim 19, further comprising:
calculating pressure drop using the values;
comparing the pressure drop to a threshold;
assigning a relationship in accordance with a position of the pressure drop relative to the threshold; and
using the second signal to impede rotation of the rotary mechanical device to decrease the downstream pressure.

* * * * *